(12) United States Patent
Maeda

(10) Patent No.: US 6,265,041 B1
(45) Date of Patent: Jul. 24, 2001

(54) COVER SHEET FOR PTP

(75) Inventor: Sigeru Maeda, Itami (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 09/269,041

(22) PCT Filed: Oct. 22, 1997

(86) PCT No.: PCT/JP97/03820

§ 371 Date: Mar. 18, 1999

§ 102(e) Date: Mar. 18, 1999

(87) PCT Pub. No.: WO98/18692

PCT Pub. Date: May 7, 1998

(30) Foreign Application Priority Data

Oct. 25, 1996 (JP) .................................................... 8-283703
Apr. 28, 1997 (JP) .................................................... 9-110887

(51) Int. Cl.$^7$ ................................. B32B 1/08; B32B 5/16; B32B 18/00; B32B 27/30; B65D 83/04

(52) U.S. Cl. ........................ 428/36.6; 206/531; 428/324; 428/325; 428/329; 428/330; 428/331; 428/522

(58) Field of Search ...................................... 428/323, 324, 428/325, 329, 330, 331, 522, 36.6; 206/531, 532, 530

(56) References Cited

U.S. PATENT DOCUMENTS

| 5,100,721 | * | 3/1992 | Akao | ................................... | 428/218 |
| 5,522,506 | * | 6/1996 | Roulin et al. | ........................ | 206/531 |

FOREIGN PATENT DOCUMENTS

| 0613832A1 | 9/1994 | (EP) . |
| 1054601 | 1/1967 | (GB) . |
| 57-15960A | 1/1982 | (JP) . |
| 60-77876A | 5/1985 | (JP) . |
| 60-77876 | * 5/1985 | (JP) . |
| 2-69538A | 3/1990 | (JP) . |
| 404085338 | * 3/1992 | (JP) . |

* cited by examiner

Primary Examiner—D. S. Nakarani
Assistant Examiner—Holly C. Rickman
(74) Attorney, Agent, or Firm—Smith, Gambrell & Russell

(57) ABSTRACT

The present invention provides a cover sheet for PTP which is not needed to be separated from the base material after use of PTP and is convenient in recycling and disposal after use and advantageous for environmental protection and which is excellent in push-through property. This cover sheet for PTP has a thickness of 0.01–1 mm and comprises a resin composition containing 5–250 parts by weight of an inorganic filler based on 100 parts by weight of a polyvinyl chloride based resin, the sheet having a bursting strength of 0.01–5 kg/cm$^2$.

16 Claims, 1 Drawing Sheet

COVER SHEET FOR PTP

TECHNICAL FIELD

The present invention relates to a cover sheet for press-through-package (hereinafter referred to as "PTP") used for packaging of pharmaceuticals in the form of tablets, capsules, etc., foods, and others.

BACKGROUND ART

Pharmaceuticals and foods are usually packaged in the following manner. That is, a base material is made by forming a plastic sheet into a sheet having pockets, contents are put in the pocket portions, and an aluminum foil cover coated with an adhesive is allowed to adhere to the flat part of the base material other than the pocket portions by heating, etc. This package is called PTP. The aluminum foil is broken through by pressing the pocket portions of the base material by fingers to take out the content. Thus, this packaging is very convenient and widely used.

However, in the conventional PTP, the cover material comprises an aluminum foil (inorganic material) and the base material comprises a plastic (organic material), which utterly differ from each other. Therefore, they must be separated after use, and it is very difficult to perform recycling or incineration of them after use. Under the circumstances, it has been desired to use plastics also for the cover material in place of the aluminum foil. However, usual plastic sheets are too strong as cover materials, and lack push-through property in use (when the content is to be taken out). The push-through property here means easiness to break the cover material adhering to the base material in taking out the contents such as tablets which are packed in the pockets of the base material formed by molding. For imparting the push-through property to plastic sheets, there is a method of filling the sheets with fillers such as inorganic fillers, but if the particle size of the fillers is large, the appearance of sheets becomes rough to cause sometimes non-uniformity of the push-through property.

DISCLOSURE OF INVENTION

The object of the present invention is to provide a cover sheet for PTP which is convenient in recycling and incineration for disposal after use to inhibit production of rubbish and which is excellent in push-through property.

The present invention is a cover sheet for PTP characterized in that the sheet of 0.01–1 mm thickness comprises a resin composition containing 5–250 parts by weight of an inorganic filler for 100 parts by weight of a polyvinyl chloride based resin, said polyvinyl chloride based resin has an average polymerization degree of 500–1300, and the sheet has a bursting strength of 0.01–5.0 kg/cm$^2$ measured by Muller low pressure test method specified in JIS P8112. According to a more preferred embodiment, the sheet has a flex temperature of 50–100° C. measured by Clash-Berg test method specified in JIS K6734, the inorganic filler is at least one of talc, silica, kaolin, mica, alumina, wollastonite, clay and calcium carbonate, the inorganic filler has an average particle size of 0.5–100 µm, and the polyvinyl chloride based resin contains a vinyl chloride-vinyl acetate copolymer having a vinyl acetate content of 3–15% by weight.

The polyvinyl chloride based resin used in the present invention is excellent in moldability and formability, transparency, heat resistance, electrical insulation properties and cost. Especially, regarding the moldability and formability, the temperature range at which it can be thermoformed is wider than that of other resins, and furthermore, it is superior in transparency and the content can be readily seen. Thus, the resin is particularly suitable for PTP in view of these points.

The polyvinyl chloride based resin used has an average polymerization degree of 500–1300. If it is less than 500, melt viscosity at the time of sheet formation decreases to cause reduction in stiffness and deterioration in processability, and if it is more than 1300, melt viscosity increases and high temperatures are required for sheet formation from the resin with inorganic fillers and, thus, troubles occur in making the sheet. The average polymerization degree is more preferably 500–1100.

The polyvinyl chloride based resins used in the present invention may be straight polyvinyl chloride resins, copolymers with ethylene, vinyl acetate or the like, mixtures thereof or chlorinated polyvinyl chloride resins. Especially, vinyl chloride-vinyl acetate copolymer resins are superior to polyvinyl chloride resin in that processing temperature decreases and thermoplastic fluidity increases, and, simultaneously, the range of proper processing temperature is broadened, and solubility of the resin in solvents is improved to result in decrease of melt viscosity. The content of vinyl acetate in the vinyl chloride-vinyl acetate copolymer resin is preferably 3–15% by weight. If the content is less than 3% by weight, the effect of improvement is not developed, and if it is more than 15% by weight, the softening temperature decreases too much, heat distortion becomes larger and a sheet having a sufficient heat resistance cannot be obtained, and furthermore, water resistance, chemical resistance and oil resistance are apt to be deteriorated. The vinyl acetate content is more preferably 3–10% by weight.

As the polyvinyl chloride based resin used in the present invention, preferred is a resin which comprises 1–80% by weight of a polyvinyl chloride resin and 20–99% by weight of a vinyl chloride-vinyl acetate copolymer resin. If the content of the vinyl chloride-vinyl acetate copolymer resin is less than 20% by weight, the processing temperature increases too much and thermoplastic fluidity decreases, the proper processing temperature range is not broadened, and troubles are apt to occur at the time of PTP formation. The content of the vinyl chloride-vinyl acetate copolymer resin is more preferably 30–99% by weight.

In order for the PTP cover sheet to have push-through property, it is necessary to fill the sheet with inorganic fillers. As the inorganic fillers, there may be cited talc, silica, kaolin, mica, alumina, wollastonite, clay, calcium carbonate, asbestos, glass fiber, aluminum sulfate, and the like. Among them, talc, silica, kaolin, mica, alumina, wollastonite, clay, and calcium carbonate are suitable from the point of easiness in handling.

Average particle size of the inorganic fillers is 0.5–100 µm, preferably 0.5–20 µm, and more preferably 0.5–5 µm. If the average particle size is more than 100 µm, roughness of the sheet increases because the particles are large, and the push-through property is apt to become non-uniform. If it is less than 0.5 µm, the size is too small and the effect of push-through property decreases.

Amount of the inorganic fillers is suitably 5–250 parts by weight based on 100 parts by weight of the polyvinyl chloride based resin. If it is less than 5 parts by weight, the sheet is strong and the content in the pocket cannot be taken out, and the desired push-through property cannot be obtained. If it is more than 250 parts by weight, the sheet is too fragile and problems often occur. The amount of the inorganic fillers is preferably 10–200 parts by weight.

Thickness of the sheet of the present invention is 0.01–1 mm. If it is thinner than 0.01 mm, this is practically not suitable and if it is thicker than 1 mm, the push-through property can hardly be obtained. The thickness is preferably 0.02–0.4 mm.

The sheet of the present invention has a flex temperature of 50–100° C., preferably 55–85° C. measured by Clash- Berg test method specified in JIS K6734. The sheet of the higher flex temperature is higher in heat resistance, that is, undergoes less change in appearance when heat is applied. However, if it exceeds 1000° C., there often occur problems in calender processability or moldability or formability in the later steps. If it is lower than 500° C., the sheet is inferior in heat resistance and shows a large change in appearance when heat is applied or sticks to sealing plate at the time of heat sealing. Thus, problems are apt to occur in the later steps.

With regard to the push-through property, the sheet has a bursting strength of 0.01–5 kg/cm$^2$ measured by Mullen low pressure test method specified in JIS P8112. If the bursting strength is lower than 0.01 kg/cm$^2$, the sheet is too fragile and is not suitable for practical use, and if it is higher than kg/cm$^2$, strength of the sheet is too high, and the push-through property can hardly be obtained. Preferably bursting strength is 0.1–3.5 kg/cm$^2$.

Method for the formation of sheet in the present invention is not particularly limited, and a mixture comprising a polyvinyl chloride based resin and an inorganic filler can be formed into a sheet by hot-melt extrusion method, calendering method, steam platen pressing method, or the like.

The sheet of the present invention is not limited to a single-layer sheet, and may be a multi-layer sheet as far as the desired properties can be obtained. For example, the multi-layer sheet can be obtained by co-extrusion method, dry-lamination method, wet-lamination method, or the like. Furthermore, in order to enhance sealing strength to the base material, a sealing layer may be provided, and the sealing layer can also be obtained for example by coating adhesives in addition to the above-mentioned co-extrusion method, dry-lamination method or wet-lamination method. Examples of the adhesives are those of vinyl chloride type, vinyl chloride-vinyl acetate type, urethane type, polyester type and acrylic type. Moreover, for enhancing adhesion between the layers, they may be previously subjected to easy-adhesion treatments such as corona treatment and flame treatment.

Furthermore, if necessary, lubricant, cross-linking agent, pigment, foaming agent, antistatic agent, anti-fogging agent, plate-out inhibitor, surface treating agent, processing aid, releasing agent, reinforcing agent and the like may be added at the time of formation of sheets.

BEST MODE FOR CARRYING OUT THE INVENTION

Figure 1:
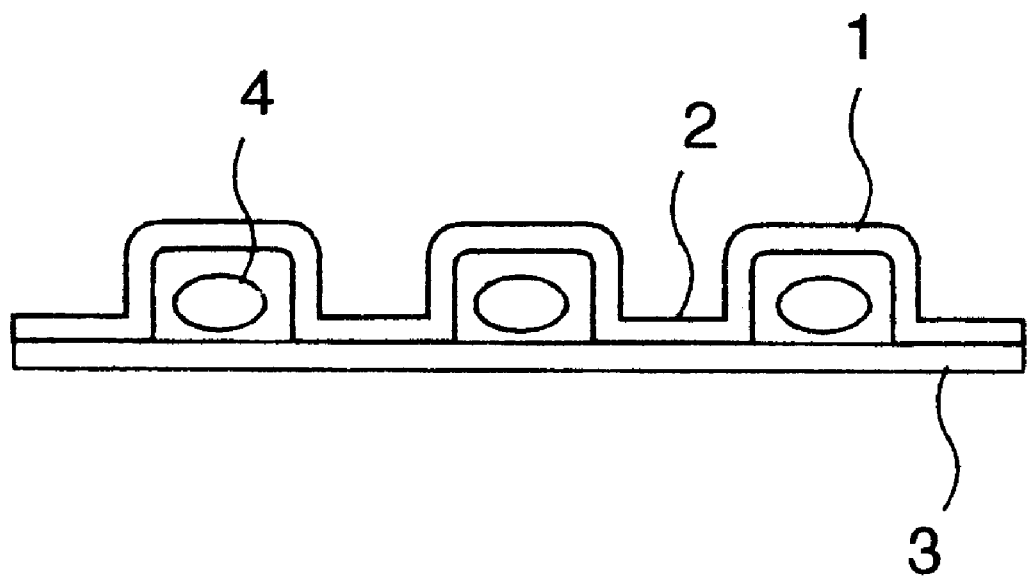
FIG. 1 is a sectional view of PTP obtained by the present invention, where 1 indicates pocket portions of base material, 2 indicates a flat part of the base material, 3 indicates a cover material, and 4 indicates a content (tablet)

The following examples illustrate the present invention, but are not to be construed as limiting its scope.

Using the compositions of resins and inorganic fillers as shown in Tables 1, 2 and 3, cover sheets were prepared by calendering method. A commercially available rigid polyvinyl chloride sheet of 0.3 mm thickness was used as a base sheet. Using the cover sheets and the base sheet, contents (tablets) were packed by a PTP forming machine of plug-pressure type (FBP-M2 manufactured by C.K.D. Co., Ltd.) to obtain PTPs. Comparative examples were conducted in the same manner using the compositions shown in Table 4.

The results of evaluation of them are shown in Tables 1, 2, 3 and 4.

TABLE 1

|  | Example 1 | Example 2 | Example 3 | Example 4 | Example 5 | Example 6 |
| --- | --- | --- | --- | --- | --- | --- |
| PVC1 | 100 | 20 |  |  |  | 100 |
| PVC2 |  | 80 |  |  |  |  |
| PVC3 |  |  | 100 |  |  |  |
| PVC4 |  |  |  | 100 |  |  |
| PVC5 |  |  |  |  | 100 |  |
| Octyltin mercaptide | 1.5 | 1.5 | 1.5 | 1.5 | 1.5 | 1.5 |
| Epoxidized soybean oil | 1.5 | 2.0 | 1.5 | 1.5 | 1.5 | 1.5 |
| Fatty acid ester | 1.0 | 1.0 | 1.0 | 1.0 | 1.0 | 1.0 |
| Montanic acid ester | 0.5 | 0.5 | 0.5 | 0.5 | 0.5 | 0.5 |
| MBS | 10 | 8 | 10 | 15 | 5 | 10 |
| Talc 1 |  | 10 |  |  |  |  |
| Kaolin 1 |  |  | 100 |  |  |  |
| Wollastonite |  |  |  |  | 25 |  |
| Silica 1 |  |  |  | 140 |  |  |
| Clay |  |  |  |  |  |  |
| Mica |  |  |  |  |  | 200 |
| Alumina | 45 |  |  |  |  |  |
| Thickness of sheet (mm) | 0.15 | 0.4 | 0.2 | 0.1 | 0.3 | 0.02 |
| Flex temperature (° C.) | 69 | 56 | 61 | 60 | 80 | 68 |
| Bursting strength (kg/cm$^2$) | 1.6 | 3.3 | 2.0 | 0.4 | 2.8 | 0.15 |
| Push-through property *1 | A | A | A | A | A | A |
| PTP form ability *2 | ○ | ○ | ○ | ○ | ○ | ○ |

*1 A—Content can be easily taken out.
B—Content can be taken out.
X—Content cannot be taken out.
*2 ○—Good.
Δ—Sticking to sealing platen somewhat occurs.
X—Sticking to sealing platen occurs much.
The criteria of *1 and *2 are applicable to also the following Tables 2–4.

TABLE 2

|  | Example 7 | Example 8 | Example 9 | Example 10 | Example 11 | Example 12 |
|---|---|---|---|---|---|---|
| PVC1 | 70 | | | | | |
| PVC2 | | | 20 | 100 | | |
| PVC3 | 30 | | | | | |
| PVC4 | | | 80 | | | |
| PVC5 | | 100 | | | | |
| PVC6 | | | | | 100 | 50 |
| PVC7 | | | | | | 50 |
| Octyltin mercaptide | 1.5 | 1.5 | 1.5 | 1.5 | 1.5 | 1.5 |
| Epoxidized soybean oil | 1.5 | 1.5 | 1.5 | 1.5 | 1.5 | 1.5 |
| Fatty acid ester | 1.0 | 1.0 | 1.0 | 1.0 | 1.0 | 1.0 |
| Montanic acid ester | 0.5 | 0.5 | 0.5 | 0.5 | 0.5 | 0.5 |
| MBS | 10 | 10 | 8 | 10 | 10 | 10 |
| Wollastonite | | | | | 180 | |
| Talc 2 | | | | 85 | | |
| Clay | | 220 | | | | |
| Silica 2 | | | 5 | | | 100 |
| Calcium carbonate 1 | 65 | | | | | |
| Thickness of sheet (mm) | 0.2 | 0.1 | 1.0 | 0.4 | 0.2 | 0.5 |
| Flex temperature (° C.) | 67 | 90 | 61 | 52 | 55 | 62 |
| Bursting strength (kg/cm$^2$) | 1.6 | 0.04 | 4.5 | 3.1 | 0.15 | 2.4 |
| Push-strength property *1 | A | A | B | A | A | A |
| PTP formability *2 | ○ | ○ | ○ | Δ | ○ | ○ |

TABLE 3

|  | Example 13 | Example 14 |
|---|---|---|
| PVC2 | 5 | |
| PVC6 | 95 | |
| PVC7 | | 100 |
| Octyltin mercaptide | 1.5 | 1.5 |
| Epoxidized soybean oil | 1.5 | 2.0 |
| Fatty acid ester | 1.0 | 1.0 |
| Montanic acid ester | 0.5 | 0.5 |
| MBS | 10 | 10 |
| Talc 2 | | 150 |
| Calcium carbonate 1 | 20 | |
| Thickness of sheet (mm) | 0.02 | 0.7 |
| Flex temperature (° C.) | 50 | 52 |
| Bursting strength (kg/cm$^2$) | 1.2 | 3.4 |
| Push-through property *1 | A | A |
| PTP formability *2 | ○ | ○ |

TABLE 4

|  | Comparative Example 1 | Comparative Example 2 | Comparative Example 3 | Comparative Example 4 |
|---|---|---|---|---|
| PVC1 | | 100 | | |
| PVC2 | 100 | | 70 | |
| PVC3 | | | | |
| PVC4 | | | 30 | |
| PVC6 | | | | 100 |
| Octyltin mercaptide | 1.5 | 1.0 | 1.5 | 1.5 |
| Epoxidized soybean oil | 1.5 | 1.0 | 1.5 | 1.5 |
| Fatty acid ester | 1.0 | 1.0 | 1.0 | 1.0 |
| Montanic acid ester | 0.5 | 0.5 | 0.5 | 0.5 |
| MBS | 10 | 10 | 10 | 10 |
| DCP | | | 15 | |
| Clay | | | | |
| Wollastonite | 3 | | | |
| Mica | | | | |
| Alumina | | | | 270 |
| Kaolin 2 | | | 260 | |
| Calcium carbonate 2 | | 20 | | |
| Thickness of sheet (mm) | 0.02 | 0.8 | 1.2 | — |
| Flex temperature (° C.) | 61 | 65 | 45 | Sheet could |

TABLE 4-continued

|  | Comparative Example 1 | Comparative Example 2 | Comparative Example 3 | Comparative Example 4 |
|---|---|---|---|---|
| Bursting strength (kg/cm²) | 5.2 | 3.5–6.5 | 5.1 | not be formed |
| Push-through property *2 | X | B–X | X |  |
| PTP formability *2 | ○ | ○ | X |  |

Forming conditions of PTP and evaluation methods are as follows.

Forming conditions: Forming temperature of pockets of base material: 120° C.; sealing temperature: 140° C.; and machine speed: 5.3 m/min.

Flex temperature: This was measured in accordance with JIS K6734 using a Clash-Berg flex temperature measuring apparatus (manufactured by Toyo Seiki Co., Ltd.)

Bursting strength: This was measured in accordance with JIS P8112 using a Mullen bursting strength tester (manufactured by Toyo Seiki Co., Ltd.).

Push-through property: Practical evaluation was conducted on easiness in taking out of the content (tablet) from PTP.

PTP formability: Practical evaluation was conducted on whether the sheet stuck to a sealing platen at the time of PTP forming and heat sealing.

Polyvinyl chloride based resins (hereinafter referred to as "PVC") used are as follows:

PCV 1: Straight PVC of 1100 in average polymerization degree.

PVC 2: Straight PVC of 510 in average polymerization degree.

PVC 3: Vinyl chloride-vinyl acetate copolymer (content of vinyl acetate: 13%) of 600 in average polymerization degree.

PVC 4: Vinyl chloride-ethylene copolymer (content of ethylene: 4%) of 1300 in average polymerization degree.

PVC 5: Chlorinated PVC (content of chloride: 64%) of 800 in average polymerization degree.

PVC 6: Vinyl chloride-vinyl acetate copolymer (content of vinyl acetate: 5%) of 600 in average polymerization degree.

PVC 7: Vinyl chloride-vinyl acetate copolymer (content of vinyl acetate: 10%) of 950 in average polymerization degree.

MBS: Methyl methacrylate-butadiene-styrene resin

DOP: Low molecular ester plasticizer

Inorganic fillers used are as follows:

|  | Average particle size (μm) |
|---|---|
| Talc 1 | 3.2 |
| Kaolin 1 | 4.8 |
| Wollastonite | 4.0 |
| Silica 1 | 1.6 |
| Clay | 0.5 |
| Mica | 2–4 |
| Alumina | 4.5 |
| Calcium carbonate 1 | 3.5 |
| Talc 2 | 25 |
| Silica 2 | 90 |

-continued

|  | Average particle size (μm) |
|---|---|
| Calcium carbonate 2 | 110 |
| Kaolin 2 | 0.3 |

The average particle size of the inorganic fillers was measured by centrifugal sedimentation method.

INDUSTRIAL APPLICABILITY

According to the present invention, there is obtained a cover sheet for PTP which is excellent in push-through property, and since this cover sheet comprises the same material as that of the base of PTP, recycling and disposal after use are convenient and this is advantageous for environmental protection.

What is claimed is:

1. A press-through package comprising a cover sheet and a base material, said cover sheet having a thickness of 0.01–1 mm and comprising a resin composition containing 5–250 parts by weight of an inorganic filler based on 100 parts by weight of a vinyl chloride resin, wherein the inorganic filler is a member selected from the group consisting of talc, silica, kaolin, mica, alumina, wollastonite, clay, calcium carbonate and mixtures thereof, having an average particle size of 0.5–100 μm, said cover sheet having a bursting strength of 0.01–5 kg/cm² measured by Mullen low pressure test method specified in JIS P8112.

2. The press-through package according to claim 1, wherein said vinyl chloride resin has an average polymerization degree of 500–1300.

3. The press-through package according to claim 1, which has a flex temperature of 50–100° C. measured by Clash-Berg test method specified in JIS K6734.

4. The press-through package according to claim 2, which has a flex temperature of 50–100° C. measured by Clash-Berg test method specified in JIS K6734.

5. The press-through package according to claim 1, wherein said vinyl chloride resin is polyvinyl chloride resin.

6. The press-through package according to claim 1, wherein said vinyl chloride resin is polyvinyl chloride resin.

7. The press-through package according to claim 3, wherein said vinyl chloride resin is polyvinyl chloride resin.

8. The press-through package according to claim 1, wherein said vinyl chloride resin comprises polyvinyl chloride resin and vinyl chloride-vinyl acetate copolymer resin.

9. The press-through package according to claim 2, wherein said vinyl chloride resin comprises polyvinyl chloride resin and vinyl chloride-vinyl acetate copolymer resin.

10. The press-through package according to claim 3, wherein said vinyl chloride resin comprises polyvinyl chloride resin and vinyl chloride-vinyl acetate copolymer resin.

11. The press-through package according to claim 1, wherein said vinyl chloride resin comprises 1–80% by weight of polyvinyl chloride resin and 20–99% by weight of vinyl-chloride-vinyl acetate copolymer resin.

12. The press-through package according to claim 2, wherein said vinyl chloride resin comprises 1–80% by weight of polyvinyl chloride resin and 20–99% by weight of vinyl-chloride-vinyl acetate copolymer resin.

13. The press-through package according to claim 3, wherein said vinyl chloride resin comprises 1–80% by weight of polyvinyl chloride resin and 20–99% by weight of vinyl-chloride-vinyl acetate copolymer resin.

14. The press-through package according to claim 8, wherein said content of vinyl acetate in vinyl chloride-vinyl acetate copolymer resin is 3–15% by weight.

15. The a press-through package according to claim 11, wherein said content of vinyl acetate in vinyl chloride-vinyl acetate copolymer resin is 3–15% by weight.

16. A press through package according to claim 1 which further contains a tablet between the cover sheet and said base material.

* * * * *